United States Patent
Stegmiller et al.

(10) Patent No.: US 11,535,359 B2
(45) Date of Patent: Dec. 27, 2022

(54) FLEXIBLE AND SIMPLE TURNAROUND CARGO HANDLING ASSEMBLIES

(71) Applicant: GOODRICH CORPORATION, Charlotte, NC (US)

(72) Inventors: Wesley K. Stegmiller, Jamestown, ND (US); Dustin Paul Scheer, Jamestown, ND (US); Aaron J. Roberts, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 958 days.

(21) Appl. No.: 16/260,919

(22) Filed: Jan. 29, 2019

(65) Prior Publication Data
US 2020/0239123 A1     Jul. 30, 2020

(51) Int. Cl.
*B64C 1/20* (2006.01)
*B65G 39/12* (2006.01)
*B64D 9/00* (2006.01)
*B65G 39/02* (2006.01)

(52) U.S. Cl.
CPC .............. *B64C 1/20* (2013.01); *B64D 9/00* (2013.01); *B65G 39/025* (2013.01); *B65G 39/12* (2013.01); *B64C 2211/00* (2013.01); *B64D 2009/006* (2013.01)

(58) Field of Classification Search
CPC ........ B64C 1/20; B65G 39/025; B65G 39/12; B64D 2009/006
See application file for complete search history.

(56) References Cited

U.S. PATENT DOCUMENTS

| | | | |
|---|---|---|---|
| 4,222,695 A | 9/1980 | Sarides | |
| 4,457,649 A | 7/1984 | Vogg | |
| 4,780,043 A * | 10/1988 | Fenner | B64F 1/324 414/532 |
| 4,805,852 A | 2/1989 | Nordstrom | |
| 6,439,815 B1 | 8/2002 | Liu | |
| 7,007,786 B2 | 3/2006 | Huber et al. | |
| 7,530,773 B2 * | 5/2009 | Kress | B64C 1/20 410/80 |
| 8,342,448 B2 | 1/2013 | Huber et al. | |

(Continued)

FOREIGN PATENT DOCUMENTS

EP    214146    9/1988
JP  2010173765  8/2010

OTHER PUBLICATIONS

USPTO, Restiction/Election Requirement dated Dec. 15, 2021 in U.S. Appl. No. 16/260,868.

(Continued)

*Primary Examiner* — Nicholas McFall
*Assistant Examiner* — Marisa V Conlon
(74) *Attorney, Agent, or Firm* — Snell & Wilmer L.L.P.

(57) ABSTRACT

A convertible cargo handling assembly may comprise a mat, a fitting, and a removable cargo handling component. The fitting may include a fixed component and a coupling component. The fixed component may be located in an opening defined by the mat. The removable cargo handling component may be located over the mat and removably coupled to the fixed portion of the fitting via a coupling between the coupling component and the fixed component.

20 Claims, 10 Drawing Sheets

(56) References Cited

U.S. PATENT DOCUMENTS

| | | | |
|---|---|---|---|
| 9,033,632 B2* | 5/2015 | Komsitsky | F16B 5/0208 |
| | | | 411/182 |
| 10,773,784 B2* | 9/2020 | Huber | B64D 9/00 |
| 2012/0304579 A1* | 12/2012 | Dezoete | B64F 5/10 |
| | | | 52/745.13 |
| 2014/0202824 A1 | 7/2014 | Esser et al. | |
| 2018/0273300 A1 | 9/2018 | Weisfelner et al. | |
| 2018/0290724 A1 | 10/2018 | Nowarre et al. | |
| 2019/0210728 A1 | 7/2019 | Pfau | |

OTHER PUBLICATIONS

USPTO, Pre-interview First Office Action dated May 19, 2022 in U.S. Appl. No. 16/260,868.
USPTO, Notice of Allowance dated Sep. 1, 2022 in U.S. Appl. No. 16/260,868.

* cited by examiner

FLEXIBLE AND SIMPLE TURNAROUND CARGO HANDLING ASSEMBLIES

FIELD

The present disclosure relates generally to cargo handling systems, and more specifically, to flexible and simple turnaround cargo handling assemblies.

BACKGROUND

Aircraft cargo handling systems are generally configured either for containerized cargo, often referred to as unit load devices (ULDs), or for bulk cargo. Current aircraft cargo handling systems do not provide flexibility to easily transition between containerized handling systems and bulk handling systems. For example, current cargo handling systems may have hardware associated with containerized systems (e.g., guide rails and power drive units) permanently mounted to the aircraft. The permanently mounted hardware adds unnecessary weight, takes up space, and can cause snags, or other interferences, when loading bulk cargo. Additionally, cargo handling systems, which do not permanently attach the hardware, tend to utilize track fittings for hardware attachment. These track fitting are susceptible to foreign object debris and may create uneven surfaces that can cause snags, or other interferences, when loading bulk cargo.

SUMMARY

A convertible cargo handling assembly is disclosed herein. In accordance with various embodiments, convertible cargo handling assembly may comprise a mat, a first fitting, and a first roller tray. The first fitting may including a first fixed component located in a first opening defined by the mat, and a first coupling component configured to engage the first fixed component. The first roller tray may be located over the mat and removably coupled to the first fixed component of the first fitting via the first coupling component.

In various embodiments, the convertible cargo handling assembly may further comprise a second fitting. The second fitting may include a second fixed component located in a second opening defined by the mat, and a second coupling component configured to engage the second fixed component. A first ball mat may be located over the mat and removably coupled to the second fixed component of the second fitting the second coupling component.

In various embodiments, a power drive unit may be located in the first ball mat. In various embodiments, the convertible cargo handling assembly may further comprise a second ball mat. The first roller tray may be located between the first ball mat and the second ball mat. A first electrical connector may be located in the first roller tray and electrically coupled to the power drive unit in the first ball mat.

In various embodiments, a second roller tray may be located over the mat. A second electrical connector may be located in the second roller tray and electrically coupled to the first electrical connector.

In various embodiments, the convertible cargo handling assembly may further comprise a container configured to store the first roller tray, the second roller tray, the first ball mat, and the second ball mat. A longitudinal length of the first roller tray, a longitudinal length of the second roller tray, a longitudinal length of the first ball mat, and a longitudinal length of the second ball mat may each be less than a width of the container.

In various embodiments, the first fixed component of the first fitting may comprise a base portion defining a threaded orifice, a threaded cup located within the threaded orifice, and a threaded post located in the threaded cup.

A cargo compartment of an aircraft is also disclosed herein. In accordance with various embodiments, the cargo compartment may comprise a first aircraft frame structure and a convertible cargo handling assembly formed over the first aircraft frame structure. The convertible cargo handling assembly may comprise a mat located over the first aircraft frame structure, a first fitting, and a first removable cargo handling component. The first fitting may include a first fixed component and a first coupling component. The first fixed component may be coupled to the first aircraft frame structure. The first coupling component may be configured to rotate relative to the first fixed component. The first removable cargo handling component may be located over the mat and removably coupled to the first fixed component of the first fitting via a threaded coupling between the first coupling component and the first fixed component.

In various embodiments, the first removable cargo handling component may comprise a first roller tray. In various embodiments, the convertible cargo handling assembly may further comprise a second fitting including a second fixed component and a second coupling component. The second fixed component may be located in an opening defined by the mat. The second coupling component may be configured to rotate relative to the second fixed component. A ball mat may be removably coupled to the second fitting via a threaded coupling between the second coupling component and the second fixed component. The ball mat may include a power drive unit. In various embodiments, an electrical connector may be located in the first roller tray and electrically coupled to the power drive unit.

In various embodiments, a second aircraft frame structure may be adjacent to the first aircraft frame structure. The convertible cargo handling assembly may further comprise a second fitting including a second fixed component and a second coupling component. The second fixed component may be coupled to the second aircraft frame structure. The second coupling component may be configured to rotate relative to the second fixed component. A second roller tray may be located over the mat and removably coupled to the second fixed component of the second fitting via a threaded coupling between the second coupling component and the second fixed component.

In various embodiments, a first electrical connector may be located in the first roller tray. A second electrical connector may be located in the second roller tray and electrically coupled to the first electrical connector. In various embodiments, a surface of the first fixed component may be flush with a surface of the mat.

In accordance with various embodiments, a convertible cargo handling assembly may comprise a mat, a first fitting, and a first removable cargo handling component. The first fitting may include a first fixed component and a first coupling component. The first fixed component may be located in a first opening defined by the mat. The first removable cargo handling component may be located over the mat and removably coupled to the first fixed component of the first fitting via a coupling between the first coupling component and the first fixed component.

In various embodiments, the first fixed component may comprise a base portion defining a threaded orifice, a threaded cup located within the threaded orifice, and a threaded post located in the threaded cup. In various embodiments, the first removable cargo handling component may comprise a first roller tray.

In various embodiments, the convertible cargo handling assembly may further comprise a second fitting and a ball mat. The second fitting may include a second fixed component and a second coupling component. The second fixed component may be located in a second opening defined by the mat. The ball mat may be located over the mat and removably coupled to the second fixed component of the second fitting via a coupling between the second coupling component and the second fixed component.

In various embodiments, a first electrical connector may be located in the first roller tray. The ball mat may comprise a power drive unit. The power drive unit may be electrically coupled to the first electrical connector.

In various embodiments, the convertible cargo handling assembly may further comprise a third fitting and a second roller tray. The third fitting may include a third fixed component and a third coupling component. The third fixed component may be located in a third opening defined by the mat. The second roller tray may be located over the mat and removably coupled to the third fixed component of the third fitting via a coupling between the third coupling component and the third fixed component. A second electrical connector may be located in the second roller tray and electrically coupled to the first electrical connector.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion. As used herein, "proximate" refers to a direction toward, or a location generally closer to a reference component. As used herein, "longitudinal" refers to a forward to aft direction.

Convertible cargo handling assemblies, as disclosed herein, may be configured to easily convert between handling containerized cargo (or ULDs), wherein multiple cargo items are bundled into containers and the containers are loaded into and out of an aircraft, and handling bulk cargo, wherein cargo items are loaded individually into and out of an aircraft. In accordance with various embodiments, the cargo handling components employed for containerized cargo may be removably coupled via fittings. The fittings may include a threaded coupling and may allow the containerized components to be quickly and easily installed and removed. When the containerized components are removed, the surfaces of the cargo area (e.g., the floor and walls) may be flush, thereby reducing the protentional for bulk cargo to snag.

Figure 1:
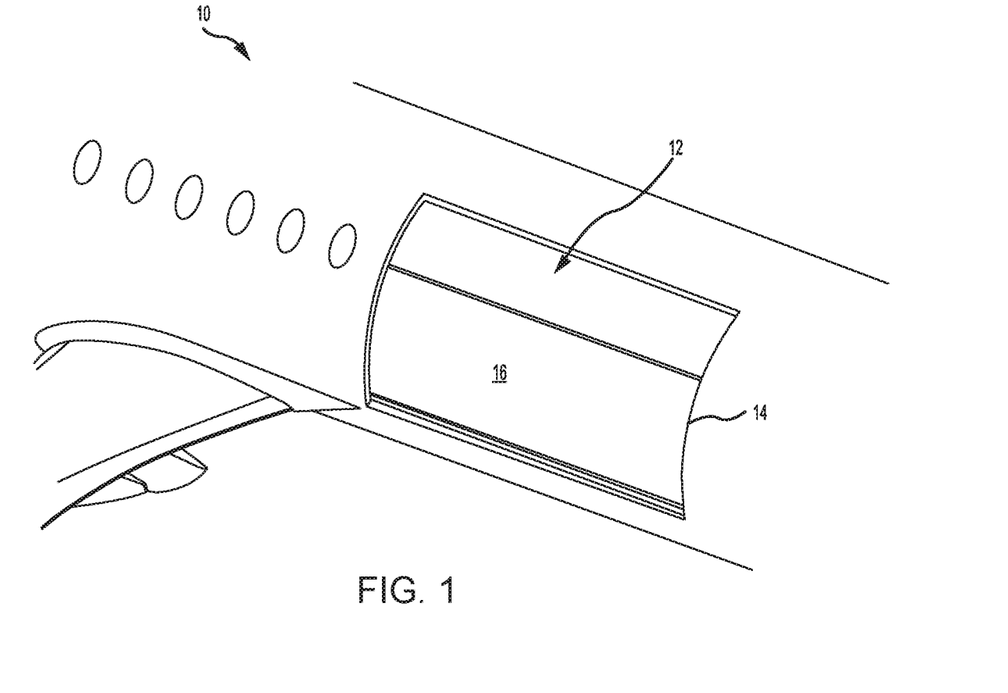
FIG. 1 illustrates a perspective view of an aircraft cargo compartment, in accordance with various embodiments.

With reference to FIG. 1, an aircraft 10 having a cargo compartment 12 is illustrated. A cargo door 14 provides access to cargo compartment 12. Cargo (e.g., pallet, ULDs, and/or bulk cargo) may be loaded and unloaded through cargo door 14 and onto a cargo deck 16.

Figure 2A:
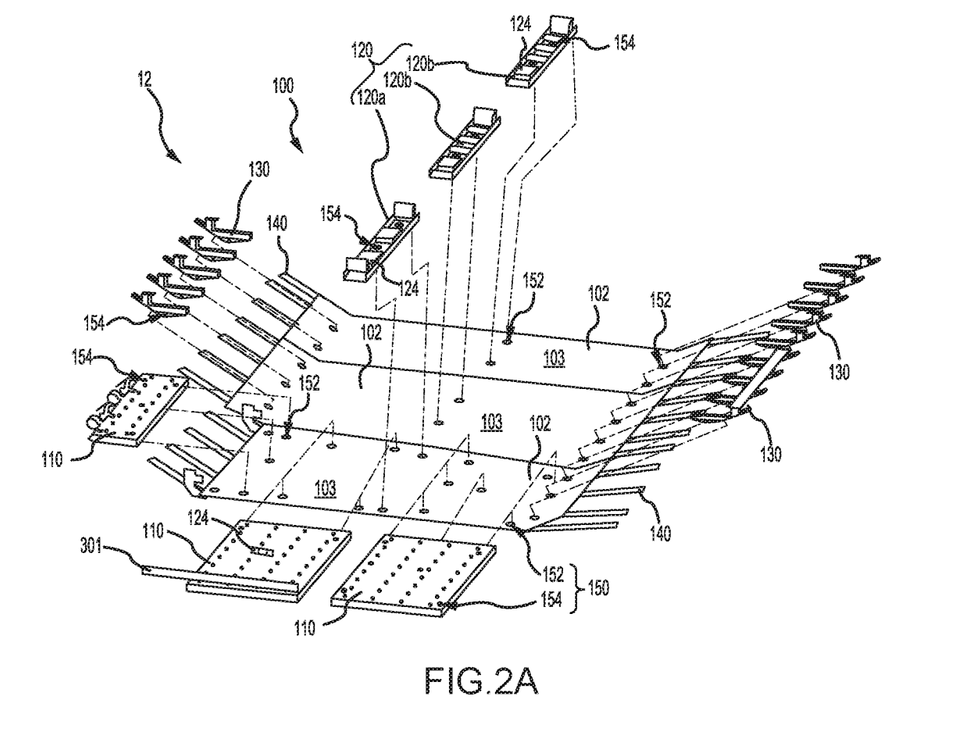
FIG. 2A illustrates an assembly view of a convertible cargo handling assembly, in accordance with various embodiments.
Figure 2B:
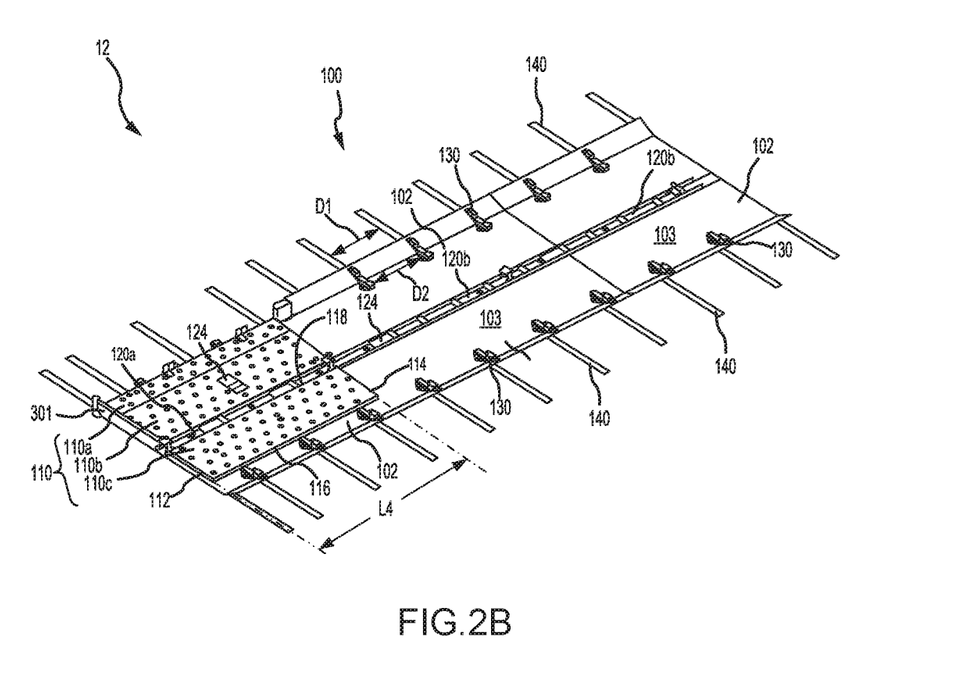
FIG. 2B illustrates a convertible cargo handling assembly configured for handling containerized cargo, in accordance with various embodiments.
Figure 2C:
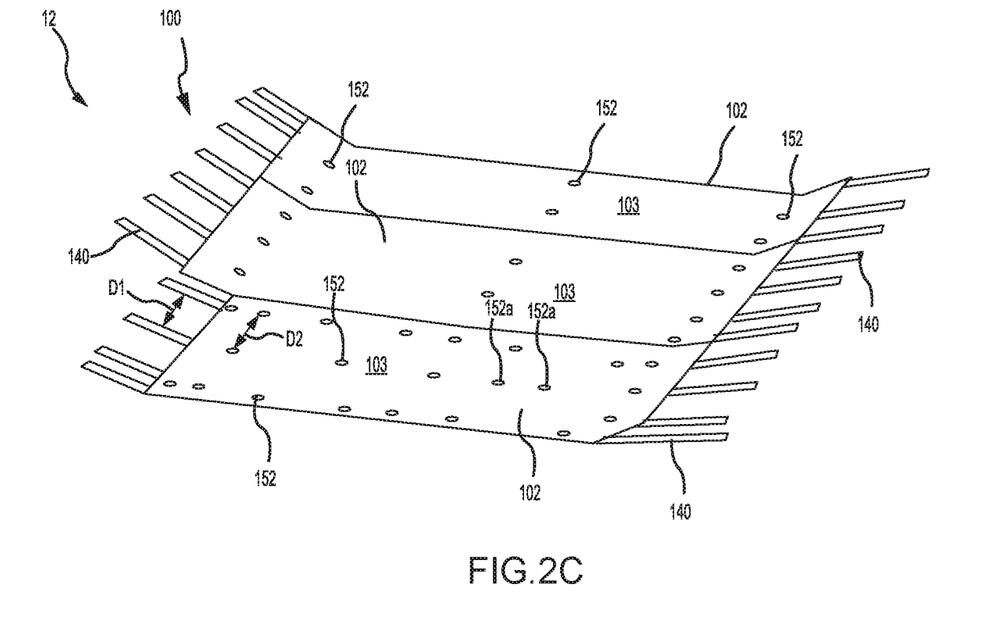
FIG. 2C illustrates a convertible cargo handling assembly configured for handling bulk cargo, in accordance with various embodiments.

With reference to FIGS. 2A, 2B, and 2C, a convertible cargo handling assembly 100, which may be located within cargo compartment 12, is illustrated. In accordance with various embodiments, convertible cargo handling assembly 100 may be converted between a containerized mode (FIG. 2B) configured to handle containerized cargo and a bulk mode (FIG. 2C) for handling bulk cargo items individually. Convertible cargo handling assembly 100 comprises a plurality of mats 102. Mats 102 may line cargo compartment 12. For example, mats 102 are located along the floor and walls of cargo compartment 12. Mats 102 are located over aircraft frame structures 140. In this regard, mats 102 may form cargo deck 16, with momentary reference to FIG. 1. In various embodiments, convertible cargo handling assembly 100 includes components configured to facilitate translation of containerized cargo along mats 102. For example, convertible cargo handling assembly 100 may include ball mats 110, roller trays 120, and guide rails 130. Ball mats 110 may be located proximate cargo door 104, with momentary reference to FIG. 1. Convertible cargo handling assembly 100 may be equipped with one or more power drive units (PDUs) 124 configured to propel containerized cargo in a desired direction. PDUs 124 may be located in roller trays 120 and/or in ball mats 110.

Ball mats 110, roller trays 120, and guide rails 130 are removably coupled to aircraft frame structures 140 via convertible cargo handling assembly fittings 150 (referred to herein as fittings 150). Each fitting 150 includes a fixed component 152 attached to aircraft frame structures 140 and a coupling component 154 attached to ball mats 110, roller trays 120, and guide rails 130. The coupling components 154 may rotate relative to, and form a threaded engagement with, the fixed components 152 to secure ball mats 110, roller trays 120, and guide rails 130 to fixed components 152 and aircraft frame structures 140. Fixed components 152 are attached, for example, via fasteners 166, with momentary reference to FIG. 3A, to aircraft frame structures 140. Accordingly, the positioning of fixed components 152 and the attachment points of ball mats 110, roller trays 120, and guide rails 130 are dictated by the location of aircraft frame structures 140. For example, if adjacent aircraft frame structures 140 are separated by a longitudinal (i.e., forward to aft) distance D1 (FIG. 2C), then fixed components 152 attached to adjacent aircraft frame structures 140 are separated by a longitudinal distance D2 that is equal to distance D1. In various embodiments, ball mats 110, roller trays 120, and guide rails 130 are secured independently of one another. Stated differently, each ball mat 110, roller tray 120, and guide rail 130 is secured via its own dedicated fitting 150, as opposed to via a coupling to an adjacent ball mat 110, roller tray 120, and/or guide rail 130. In various embodiments, ball mats 110, roller trays 120, and guide rail 130 may be secured to aircraft frame structures 140 solely via fittings 150.

The fixed components 152 are located within openings defined by mats 102. A surface 162, with momentary reference to FIG. 3A, of fixed component 152 is configured to be flush (or even) with a surface 103 of mats 102. Mats 103 and surface 162 of fixed portion 152 are configured such that, when ball mats 110, roller trays 120, and guide rails 130 are removed, the floor and walls of cargo compartment 12 comprise smooth, planar surfaces. When convertible cargo handling assembly 100 is in a containerize mode (FIG. 2B), ball mats 110, roller trays 120, and guide rails 130 are located over mats 102 and attached to fixed components 152. In this regard, in the containerize mode (FIG. 2B), at least a portion of each ball mat 110, roller tray 120, and guide rail 130 is located on, and/or overlaps, surface 103 of mats 102. When convertible cargo handling assembly 100 is in a bulk mode (FIG. 2C), ball mats 110, roller trays 120, and guide rails 130 are removed from cargo compartment 12, while fixed components 152 and mats 102 remain attached.

Referring now to FIG. 2B, and with continued reference to FIG. 2A, in various embodiments, ball mats 110 may include a sill ball mat 110*a*, one or more PDU ball mat(s) 110*b*, and one or more deck ball mat(s) 110*c*. Sill ball mat 110*a* may be located closer cargo door 104, as compared to PDU ball mat 110*b* and deck ball mat 110*c*. In various embodiments, at least one PDU 124 is located in PDU ball mat 110*b*.

In various embodiments, sill ball mat 110*a*, PDU ball mat 110*b*, and deck ball mat 110*c* may be secured to cargo compartment 12 at each of their four corners. In this regard, a coupling component 154 of fitting 150 will be attached proximate the corners of each ball mat 110, and a fixed component 152 of fitting 150 will be attached to an aircraft frame structures 140 in a location corresponding to each of the corners. The exact location of fittings 150 is dictated by aircraft frame structures 140, accordingly, fixed component 152 will be attached to the aircraft frame structure 140 closest to the corners of ball mats 110, and the location of coupling component 154 in the ball mat will correspond to the location of fixed component 152. In various embodiments, additional fitting(s) 150 may be located in areas other than the corners of ball mats 110. For example, one or more fixed components 152*a* (FIG. 2C) may be located at an approximate mid-point between edges 112 and 114 of deck ball mat 110*c* and/or at an approximate mid-point between edges 116 and 118 of deck ball mat 110*c*. As previously stated, the exact location of fixed component 152*a* is dictated by aircraft frame structures 140; accordingly, fixed components 152*a* will be attached to the aircraft frame structure 140 closest the midpoint between edges 112 and 114 and the midpoint between edges 116 and 118.

Figure 3A:
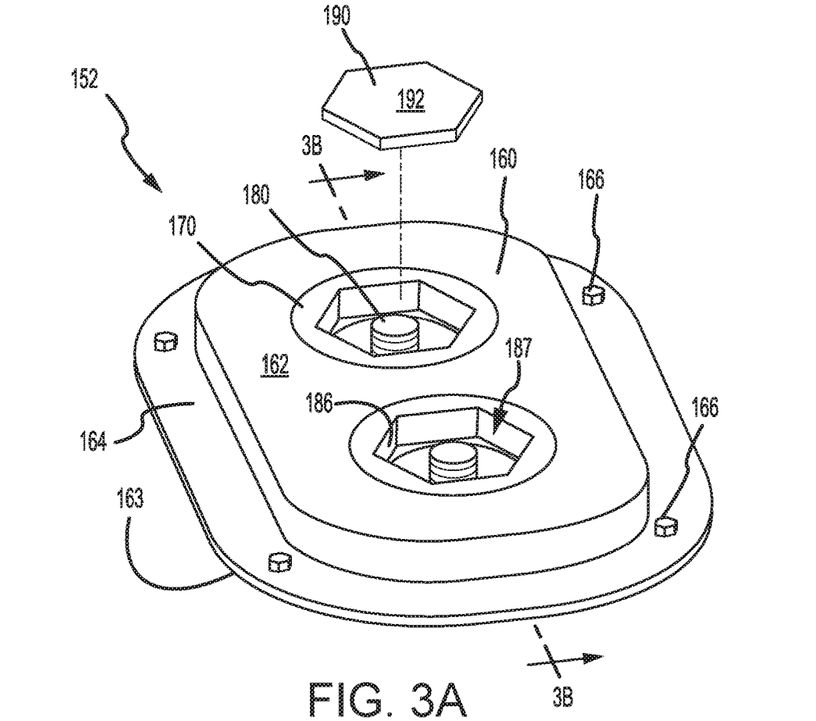
FIGS. 3A and 3B illustrate a fixed component of a convertible cargo handling assembly fitting, in accordance with various embodiments.
Figure 3B:
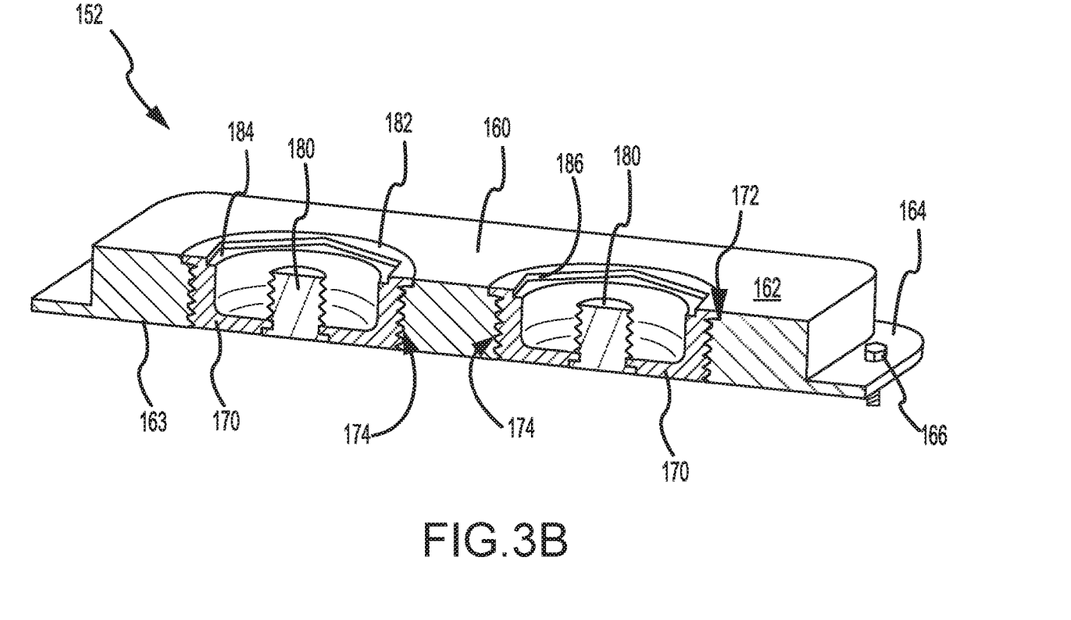

With reference to FIGS. 3A and 3B, a fixed component 152 of a fitting 150 is illustrated. various embodiments, fixed component 152 includes a base portion 160. Base portion 160 includes a flange 164. Flange 164 may be located proximate a second surface 163 of base portion 160. Second surface 163 may be opposite and oriented away from surface 162 of base portion 160. When installed, mats 102, with momentary reference to FIG. 2A, may be located on or over flange 164, such that mats 102 overlap flange 164. Fixed component 152 may be secured to aircraft frame structures 140 (FIG. 2A) via fasteners 166. Fasteners 166 may include screws, rivets, clips, nuts and bolts, or any other fastening device. In various embodiments, fasteners 166 may be located through flange 164.

One or more threaded cups 170 may be located in base portion 160. Base portion 160 may define a threaded orifice 172 configured to engage a threaded surface 174 of threaded cup 170. A threaded post 180 may be located in threaded cups 170. Threaded cups 170 include a surface 182 that is flush or planar with surface 162 of base portion 160. In various embodiments, threaded cups 170 further include a recessed surface 184 and walls 186 extending between recessed surface 184 and surface 182. Walls 186 may define a tool orifice 187 configured to receive and engage a tool having a geometry that is complementary to tool orifice 187. In this regard, tool orifice 187 is configured to engage a tool that facilitates rotating threaded cups 170, relative to base portion 160, to install threaded cups 170 into and/or remove threaded cups 170 from threaded orifices 172 in base portion 160. In various embodiments, fitting 150 may include a cap 190. Cap 190 may be placed on recessed surface 184, when convertible cargo handling assembly 100 is in bulk cargo mode. Cap 190 is configured such that surface 192 of cap 190 will be flush with surface 162 of base portion 160. Cap 190 may reduce or prevent debris from accumulating in the volume between threaded cup 170 and threaded post 180.

Figure 4A:
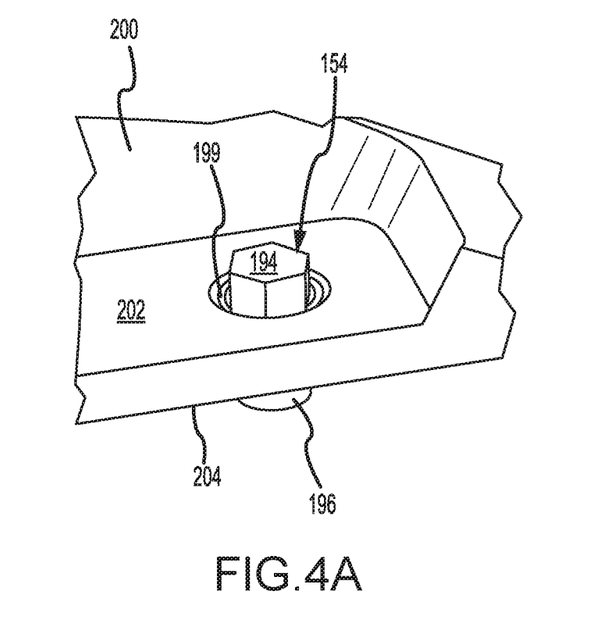
FIGS. 4A and 4B illustrate a removable cargo handling component having a coupling component of a convertible cargo handling assembly fitting attached thereto, in accordance with various embodiments.
Figure 4B:
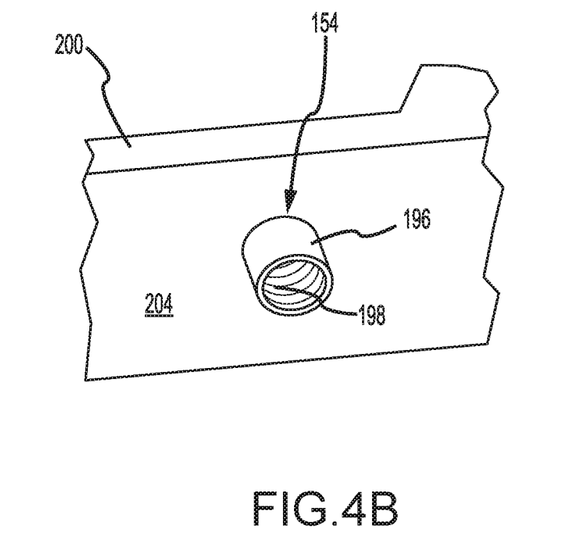

With reference to FIGS. 4A and 4B, a coupling component 154 attached to a removable cargo handling component 200 is illustrated, in accordance with various embodiments. Removable cargo handling component 200 may be a ball mat 110, a roller tray 120, or a guide rail 130 of convertible cargo handling assembly 100, with momentary reference to FIG. 2A. A head portion 194 of coupling component 154 is located at a first surface 202 of removable cargo handling component 200. A threaded portion 196 of coupling component 154 is located at a second surface 204 of removable cargo handling component 200. Second surface is opposite first surface 202 and is oriented toward fixed component 152, with momentary reference to FIG. 5, when attaching removable cargo handling component 200 to fixed portion 152. Threaded portion 196 of coupling component 154 includes a threaded surface 198.

Figure 5:
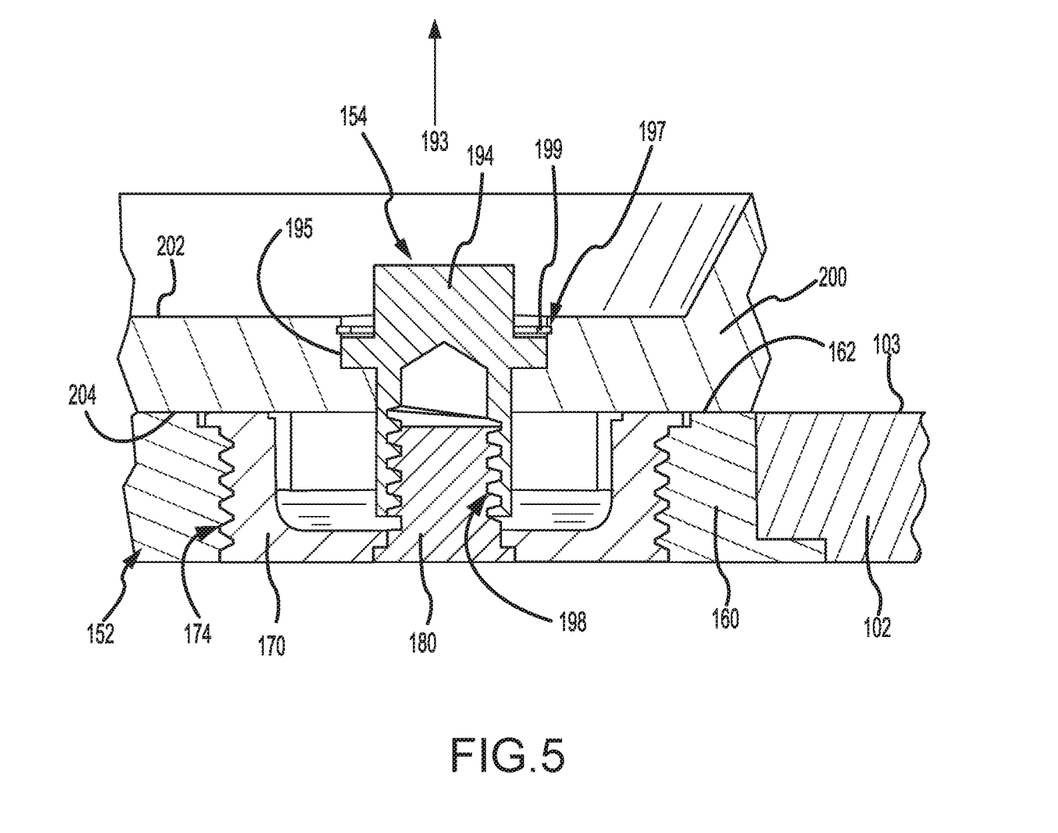
FIG. 5 illustrates a removable cargo handling component coupled to the fixed component of a convertible cargo handling assembly fitting, in accordance with various embodiments.

With reference to FIG. 5, removable cargo handling component 200 is illustrated secured to fixed component 152 of fitting 150. Threaded post 180 engages threaded surface 198 of coupling component 154. Second surface 204 of removable cargo handling component 200 may be located on or over surface 162 of base portion 160. Coupling component 154 engaging threaded post 180 of fixed component 152 secures removable cargo handling component 200 to fixed component 152 and aircraft frame structures 140 (FIG. 2A). To remove removable cargo handling component 200, an operator rotates coupling component 154 to disengage coupling component from threaded post 180.

In various embodiments, coupling component 154 may include a lip 195 formed around head portion 194. A width or diameter of lip 195 is greater than a width or diameter of head portion 194. A washer 199 may be located over lip 195. In this regard, washer 199 is closer to surface 202 of removable cargo handling component 200, as compared to lip 195. A width or diameter of washer 199, as measured at an outer circumference of washer 199, may be greater than the width or diameter of lip 195. Washer 199 may be located in a groove 197 defined by removable cargo handling component 200. Locating washer 199 in groove 197 may reduce or prevent vertical translation (i.e., translation in the direction of arrow 193) of coupling component 154 relative to removable cargo handling component 200. Locating washer 199 in groove 197 may also secure coupling component 154 to removable cargo handling component 200, thereby reducing a likelihood that coupling component 154 will become separated from removable cargo handling component 200, when convertible cargo handling assembly 100 is in bulk cargo mode (i.e., when removable cargo handling component 200 is not attached to fixed component 152).

Returning to FIG. 2B, in various embodiments, a lead roller tray 120a may be located between PDU ball mat 110b and deck ball mat 110c. Lead roller tray 120a may be electrically coupled to an aircraft power source to power the PDUs 124 in lead roller tray 120a, PDU ball mat 110b, and/or in deck roller trays 120b.

Figure 6:
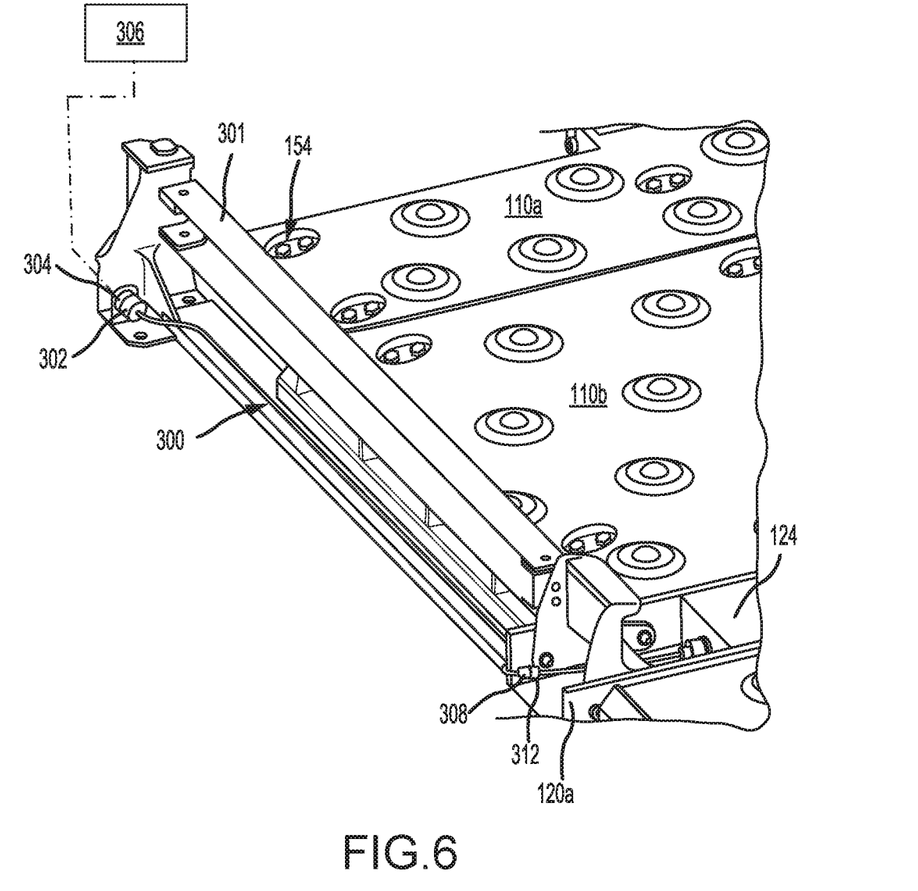
FIG. 6 illustrates electrical connection of a roller tray of a convertible cargo handling assembly, in accordance with various embodiments.

With reference to FIG. 6, details of the electrical connection to lead roller tray 120a are illustrated. In various embodiments, an aircraft electrical connector (e.g., wire) 300 is located along to a side rail 301. Side rail 301 may be attached to PDU ball mat 110b. A first end 302 of aircraft electrical connector 300 is electrically coupled to connected to an aircraft electrical interface 304. A power source 306 is electrically coupled to aircraft electrical interface 304 and supplies power (e.g., voltage) to aircraft electrical connector 300. Power supplied through aircraft electrical connector 300 drives PDUs 124.

Figure 7A:
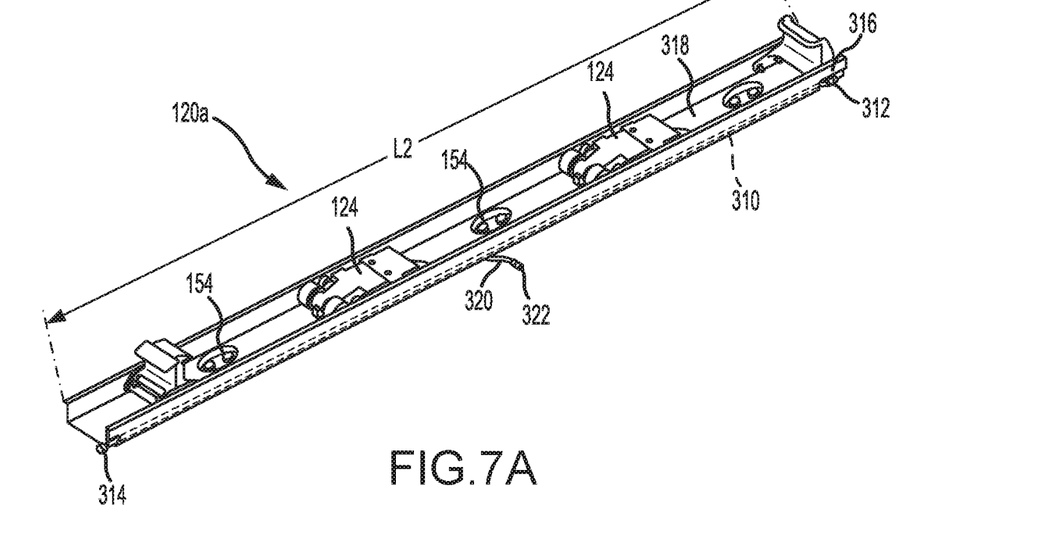
FIG. 7A illustrates a lead roller tray of a convertible cargo handling assembly, in accordance with various embodiments.

With reference to FIG. 7A, a lead roller tray 120a is illustrated, in accordance with various embodiments. In various embodiments, lead roller tray 120a includes a lead tray electrical connector (e.g. wire) 310 having an input end 312 and an output end 314. Lead tray electrical connector 310 may be located along a sidewall 316 or along a floor 318 of lead roller tray 120a. In various embodiments, coupling components 154 may be located along floor 318.

Lead tray electrical connector 310 may be electrically coupled to power source 306. For example, in various embodiments, input end 312 of lead tray electrical connector 310 is configure to engage and electrically couple to a second end 308 of aircraft electrical connector 300, with momentary reference to FIG. 6. PDUs 124 are electrically coupled to lead tray electrical connector 310. In various embodiments, lead roller tray 120a includes a mat PDU electrical connector 320. Mat PDU electrical connector 320 is electrically coupled to lead tray electrical connector 310 and to the PDU 124 located in PDU ball mat 110b, with momentary reference to FIG. 2B. For example, in various embodiments, an output end 322 of mat PDU electrical connector 320 is configured to engage and electrically couple to an electrical input of the PDU 124 in located in PDU ball mat 110b (FIG. 2B). Output end 314 of lead tray electrical connector 310 is configured to engage and electrically couple to an electrical input end of an adjacent roller tray.

Figure 7B:
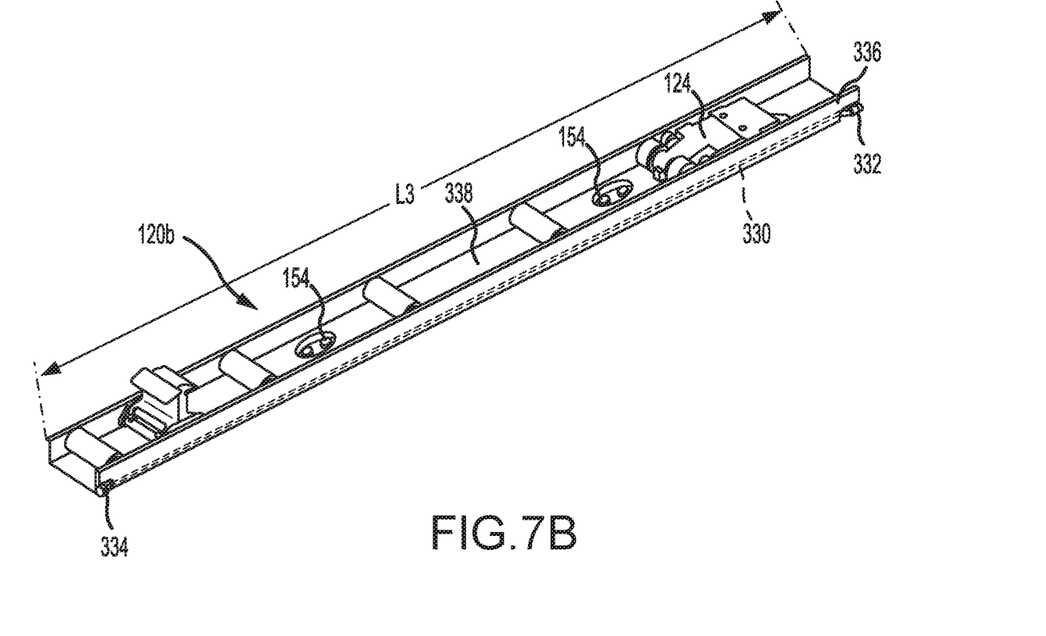
FIG. 7B illustrates a deck roller tray of a convertible cargo handling assembly, in accordance with various embodiments.

With reference to FIG. 7B, a deck roller tray 120b is illustrated, in accordance with various embodiments. In various embodiments, convertible cargo handling assembly 100 may include one or more deck roller tray(s) 120b arranged in series and electrically coupled to lead roller tray 120a and to one another. Each deck roller tray 120b includes a tray electrical connector 330. Tray electrical connector 330 may be located along a sidewall 336 or along a floor 338 of deck roller tray 120b. In various embodiments, coupling components 154 may be located along floor 338.

Tray electrical connector 330 may be connected to the tray electrical connector(s) of the adjacent roller tray(s). For example, an input end 332 of the tray electrical connector 330 in the first deck roller tray 120b of convertible cargo handling assembly 100 (i.e., in the deck roller tray 120b closest to lead roller tray 120a) is configured to engage and electrically couple to output end 314 of lead tray electrical connector 310. An output end 334 of tray electrical connector 330 is configured to engage and electrically couple to the input end 332 of the tray electrical connector 330 in the adjacent deck roller tray 120b. PDU 124 in deck roller tray 120b is electrically coupled to tray electrical connector 330. Locating aircraft electrical connector 300 along side rail 301 and electrical connectors 310, 330 in roller trays 120a, 120b allows the electrical connectors to be removed when convertible cargo handling assembly 100 is in bulk cargo mode, which reduces weight.

Figure 8:
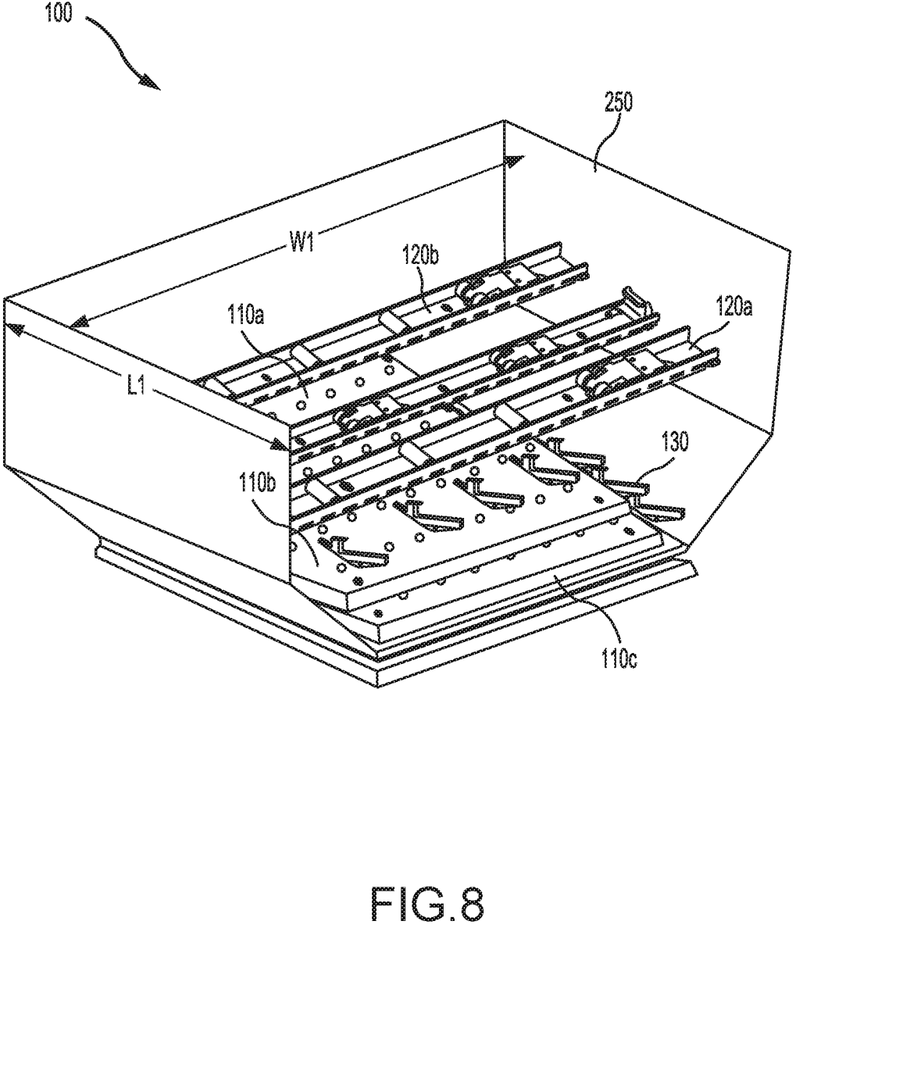
FIG. 8 illustrates removable cargo handling components configured for handling containerized cargo stored in a convertible cargo handling assembly container, in accordance with various embodiments.

With reference to FIG. 8, in various embodiments, convertible cargo handling assembly 100 includes a container 250. The removable cargo handling components of convertible cargo handling assembly 100 (i.e., lead roller tray 120a, deck roller trays 120b, sill ball mat 110a, PDU ball mat 110b, deck ball mat 110c, and guide rails 130) may be stored in container 250, when convertible cargo handling assembly 100 is in bulk mode (FIG. 2C). Lead roller tray 120a, deck roller trays 120b, sill ball mat 110a, PDU ball mat 110b, deck ball mat 110c, and guide rails 130 are each sized to fit within container 250.

Container 250 may be a ULD. In this regard, container 250 may be sized and configured to be loaded, secured, and unloaded by conventional ULD cargo handling systems, in addition to convertible cargo handling assemblies, as disclosed herein. In various embodiments, lead roller tray 120a, deck roller trays 120b, sill ball mat 110a, PDU ball mat 110b, deck ball mat 110c, and guide rails 130 are each sized to fit within an ULD. Stated differently, lead roller tray 120a, deck roller trays 120b, sill ball mat 110a, PDU ball mat 110b, deck ball mat 110c, and guide rails 130 are configured to fit within a container having a longitudinal length L1 at its longest point and a width W1 at its widest point. For example, if container 250 has a width W1 of 125.0 inches (317.5 cm), then a longitudinal length L2 of lead roller tray 120a (FIG. 7A), a longitudinal length L3 deck roller trays 120b (FIG. 7B), and a longitudinal length L4 of ball mats 110a, 110b, 110c (FIG. 2B) are each less than 125.0 inches (317.5 cm). If container 250 has a width W1 of 79.0 inches (200.7 cm), then longitudinal length L2 of lead roller tray 120a (FIG. 7A), longitudinal length L3 deck roller trays 120b (FIG. 7B), and longitudinal length L4 of ball mats 110a, 110b, 110c (FIG. 2B) are each less than 79.0 inches (200.7 cm). In various embodiments, longitudinal length L4 (FIG. 2B) may be less than the longitudinal length L1 of container 250. For example, if longitudinal length L1 is 88.0 inches (223.5 cm), then longitudinal length L4 is less 88.0 inches (223.5 cm); if longitudinal length L1 is 60.4 inches (153.4 cm), than longitudinal length L4 of ball mats 110a, 110b, 110c (FIG. 2B) is less 60.4 inches (153.4 cm).

Configuring the removable cargo handling components of convertible cargo handling assembly 100 to fit within a ULD, allows container 250 to be transported via ULD cargo handling systems. For example, if a particular aircraft is in bulk mode, the removable components associated with the aircraft's convertible cargo handling assembly 100 may be shipped to a different location and installed in a second aircraft equipped with fixed portions 152.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A convertible cargo handling assembly, comprising:
   a mat;
   a first fitting including a first fixed component located in a first opening defined by the mat and a first coupling component configured to engage the first fixed component, the first fixed component fixed to an aircraft frame structure; and
   a first roller tray located over the mat and removably coupled to the first fixed component of the first fitting via the first coupling component, thereby coupling the first roller tray to the aircraft frame structure via the first fitting.

2. The convertible cargo handling assembly of claim 1, further comprising:
   a second fitting including a second fixed component located in a second opening defined by the mat and a second coupling component configured to engage the second fixed component; and
   a first ball mat located over the mat and removably coupled to the second fixed component of the second fitting via the second coupling component.

3. The convertible cargo handling assembly of claim 2, further comprising a power drive unit located in the first ball mat.

4. The convertible cargo handling assembly of claim 3, further comprising:
   a second ball mat, wherein the first roller tray is located between the first ball mat and the second ball mat; and
   a first electrical connector located in the first roller tray and electrically coupled to the power drive unit in the first ball mat.

5. The convertible cargo handling assembly of claim 4, further comprising:
   a second roller tray located over the mat; and
   a second electrical connector located in the second roller tray and electrically coupled to the first electrical connector.

6. The convertible cargo handling assembly of claim 5, further comprising a container configured to store the first roller tray, the second roller tray, the first ball mat, and the second ball mat, wherein a longitudinal length of the first roller tray, a longitudinal length of the second roller tray, a longitudinal length of the first ball mat, and a longitudinal length of the second ball mat are each less than a width of the container.

7. The convertible cargo handling assembly of claim 1, wherein the first fixed component of the first fitting comprises:
   a base portion defining a threaded orifice;
   a threaded cup located within the threaded orifice; and
   a threaded post located in the threaded cup.

8. A cargo compartment of an aircraft comprising:
   a first aircraft frame structure; and
   a convertible cargo handling assembly formed over the first aircraft frame structure, the convertible cargo handling assembly comprising:
      a mat located over the first aircraft frame structure;
      a first fitting including a first fixed component located in a first opening defined by the mat and a first coupling component, wherein the first fixed component is coupled to the first aircraft frame structure, and wherein the first coupling component is configured to rotate relative to the first fixed component; and
      a first removable cargo handling component located over the mat and removably coupled to the first fixed component of the first fitting via a threaded coupling between the first coupling component and the first fixed component, thereby coupling the first removable cargo handling component to the first aircraft frame structure via the first fitting,
      wherein the first removable cargo handling component comprises a first roller tray or a first ball mat.

9. The cargo compartment of claim 8, wherein the first removable cargo handling component comprises the first roller tray.

10. The cargo compartment of claim 9, wherein the convertible cargo handling assembly further comprises:
    a second fitting including a second fixed component and a second coupling component, wherein the second fixed component is located in an opening defined by the mat, and wherein the second coupling component is configured to rotate relative to the second fixed component; and
    a ball mat removably coupled to the second fitting via a threaded coupling between the second coupling component and the second fixed component, wherein the ball mat includes a power drive unit.

11. The cargo compartment of claim 10, further comprising an electrical connector located in the first roller tray and electrically coupled to the power drive unit.

12. The cargo compartment of claim 9, further comprising a second aircraft frame structure adjacent to the first aircraft frame structure, wherein the convertible cargo handling assembly further comprises:
    a second fitting including a second fixed component and a second coupling component, wherein the second fixed component is coupled to the second aircraft frame structure, and wherein the second coupling component is configured to rotate relative to the second fixed component; and
    a second roller tray located over the mat and removably coupled to the second fixed component of the second fitting via a threaded coupling between the second coupling component and the second fixed component.

13. The cargo compartment of claim 12, further comprising:
    a first electrical connector located in the first roller tray; and
    a second electrical connector located in the second roller tray and electrically coupled to the first electrical connector.

14. The cargo compartment of claim 13, wherein a surface of the first fixed component is flush with a surface of the mat.

15. A convertible cargo handling assembly, comprising:
    a mat;
    a first fitting including a first fixed component and a first coupling component, wherein the first fixed component is located in a first opening defined by the mat, the first fixed component fixed to an aircraft frame structure; and
    a first removable cargo handling component located over the mat and removably coupled to the first fixed component via a coupling between the first coupling component and the first fixed component, thereby coupling the first removable cargo handling component to the aircraft frame structure via the first fitting,
    wherein the first removable cargo handling component comprises a first roller tray or a first ball mat.

16. The convertible cargo handling assembly of claim 15, wherein the first fixed component comprises:
    a base portion defining a threaded orifice;
    a threaded cup located within the threaded orifice; and
    a threaded post located in the threaded cup.

17. The convertible cargo handling assembly of claim 15, wherein the first removable cargo handling component comprises the first roller tray.

18. The convertible cargo handling assembly of claim 17, further comprising:
    a second fitting including a second fixed component and a second coupling component, wherein the second fixed component is located in a second opening defined by the mat; and
    a ball mat located over the mat and removably coupled to the second fixed component of the second fitting via a coupling between the second coupling component and the second fixed component.

19. The convertible cargo handling assembly of claim 18, further comprising a first electrical connector located in the first roller tray, wherein the ball mat comprises a power drive unit, and wherein the power drive unit is electrically coupled to the first electrical connector.

20. The convertible cargo handling assembly of claim 19, further comprising:
- a third fitting including a third fixed component and a third coupling component, wherein the third fixed component is located in a third opening defined by the mat;
- a second roller tray located over the mat and removably coupled to the third fixed component of the third fitting via a coupling between the third coupling component and the third fixed component; and
- a second electrical connector located in the second roller tray and electrically coupled to the first electrical connector.

\* \* \* \* \*